United States Patent [19]

Michalewski et al.

[11] Patent Number: 5,555,616
[45] Date of Patent: Sep. 17, 1996

[54] METHOD AND APPARATUS FOR POSITIONING OF TOOLING EFFICIENTLY

[75] Inventors: David Michalewski, Cheektowaga; Ernest K. Krell, Lewiston, both of N.Y.

[73] Assignee: Gemcor Engineering Corporation, Buffalo, N.Y.

[21] Appl. No.: 135,914

[22] Filed: Oct. 13, 1993

[51] Int. Cl.$^6$ ..................................................... B23P 11/00
[52] U.S. Cl. ........................ 29/509; 29/243.54; 29/34 B; 29/525.06
[58] Field of Search ..................................... 29/509, 525.2, 29/525.1, 465, 243.53, 243.54, 243.58, 26 R, 34 B; 227/53, 61; 408/53, 234, 236

[56] References Cited

U.S. PATENT DOCUMENTS

| | | | |
|---|---|---|---|
| 2,334,982 | 11/1943 | Arnoldi et al. | 29/243.53 |
| 4,759,109 | 7/1988 | Mason et al. | 29/243.54 |
| 4,762,261 | 8/1988 | Hawly et al. | 29/243.53 X |
| 4,858,289 | 8/1989 | Speller, Sr. | 29/243.53 X |
| 4,864,702 | 9/1989 | Speller, Sr. et al. | 29/243.53 X |
| 5,005,398 | 4/1991 | Evans | 29/243.58 X |

*Primary Examiner*—Peter Vo
*Assistant Examiner*—Khan V. Nguyen
*Attorney, Agent, or Firm*—Hodgson, Russ, Andrews, Woods & Goodyear, LLP

[57] ABSTRACT

Apparatus and method for positioning tooling with respect to a workpiece such as for positioning an anvil and clamping members on the inner surface of a fuselage being riveted. The apparatus comprises a tooling head, a frame for supporting the head, a carriage for moving the frame relative to the workpiece including movement of the frame along an axis. The frame is movable radially of the axis toward and away from the workpiece for macro-movement of the head. The head is also movable relative to the frame for movement of the tooling radially of the axis toward and away from the workpiece for micro-movement of the tooling for clamping to and unclamping from the workpiece as well as to clear flange portions of stringers being riveted to the workpiece. The micro-movement of the tooling head relative to the frame is provided so as to achieve decreased production cycle time as well as reduced power expenditure for reduced cost during movement from one riveting location to another so that the riveting operation may be at reduced cost.

10 Claims, 3 Drawing Sheets

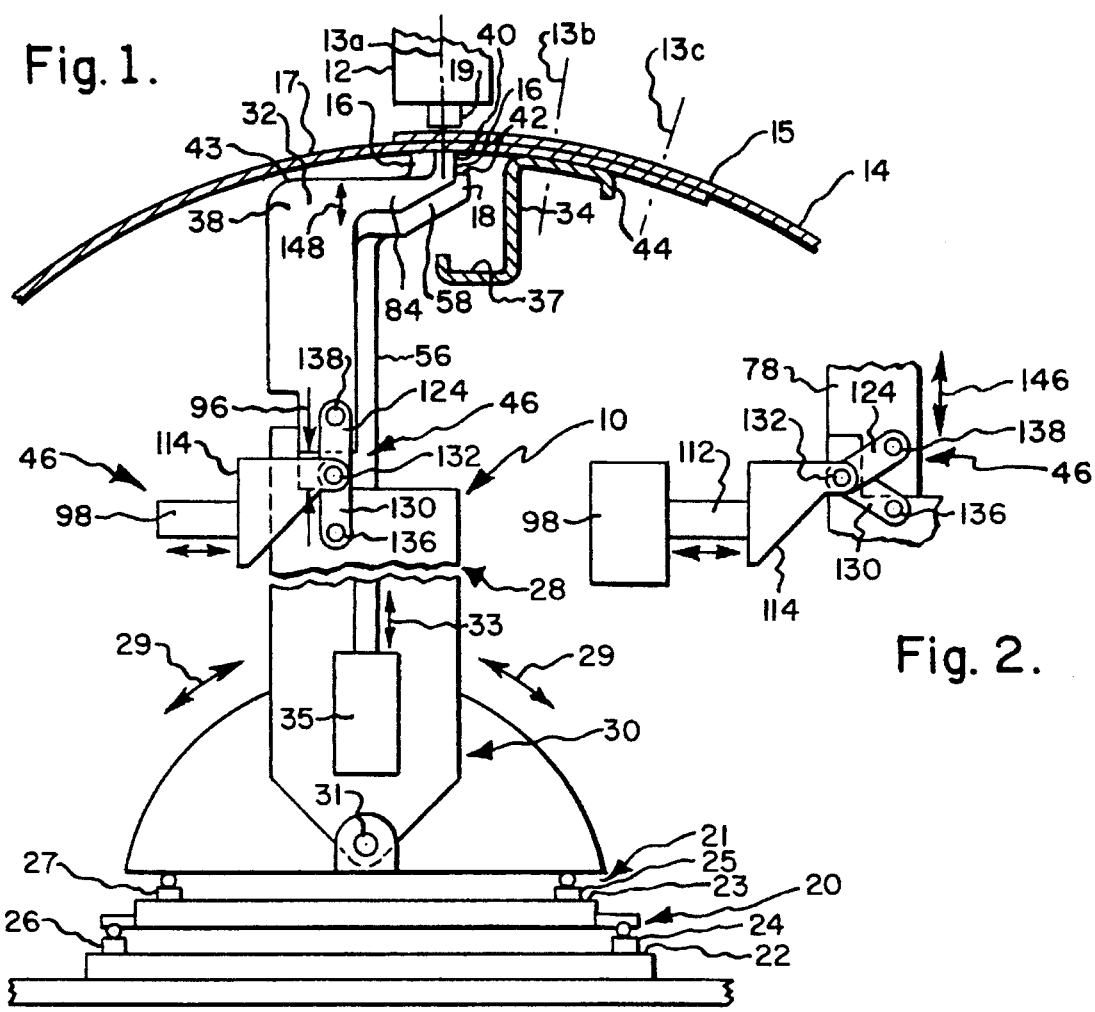
Fig. 1.
Fig. 2.
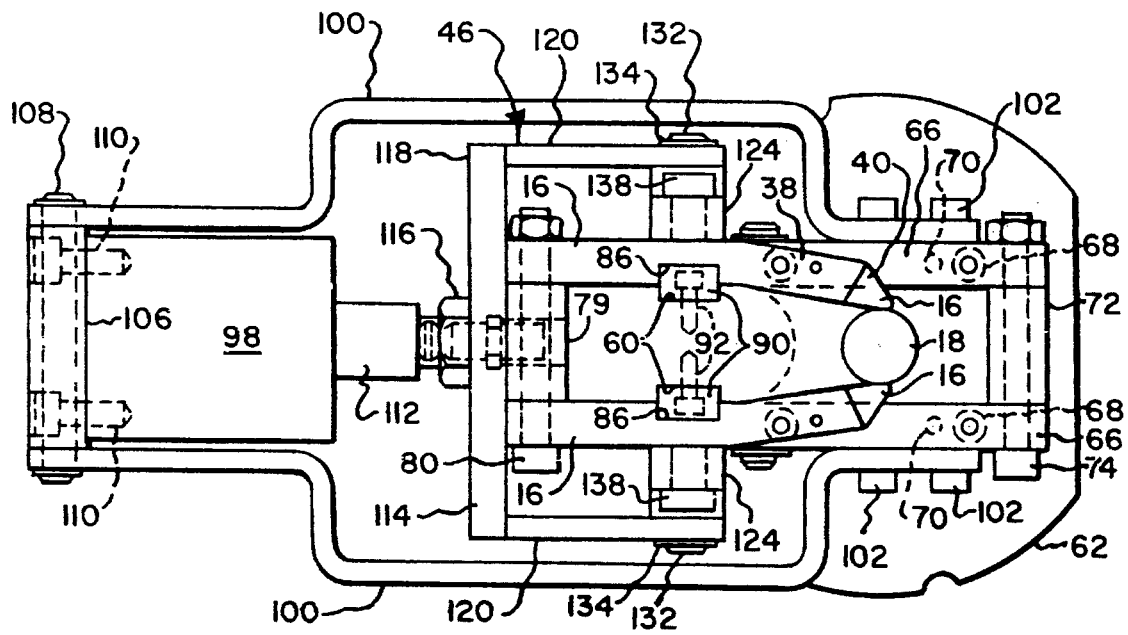
Fig. 3.

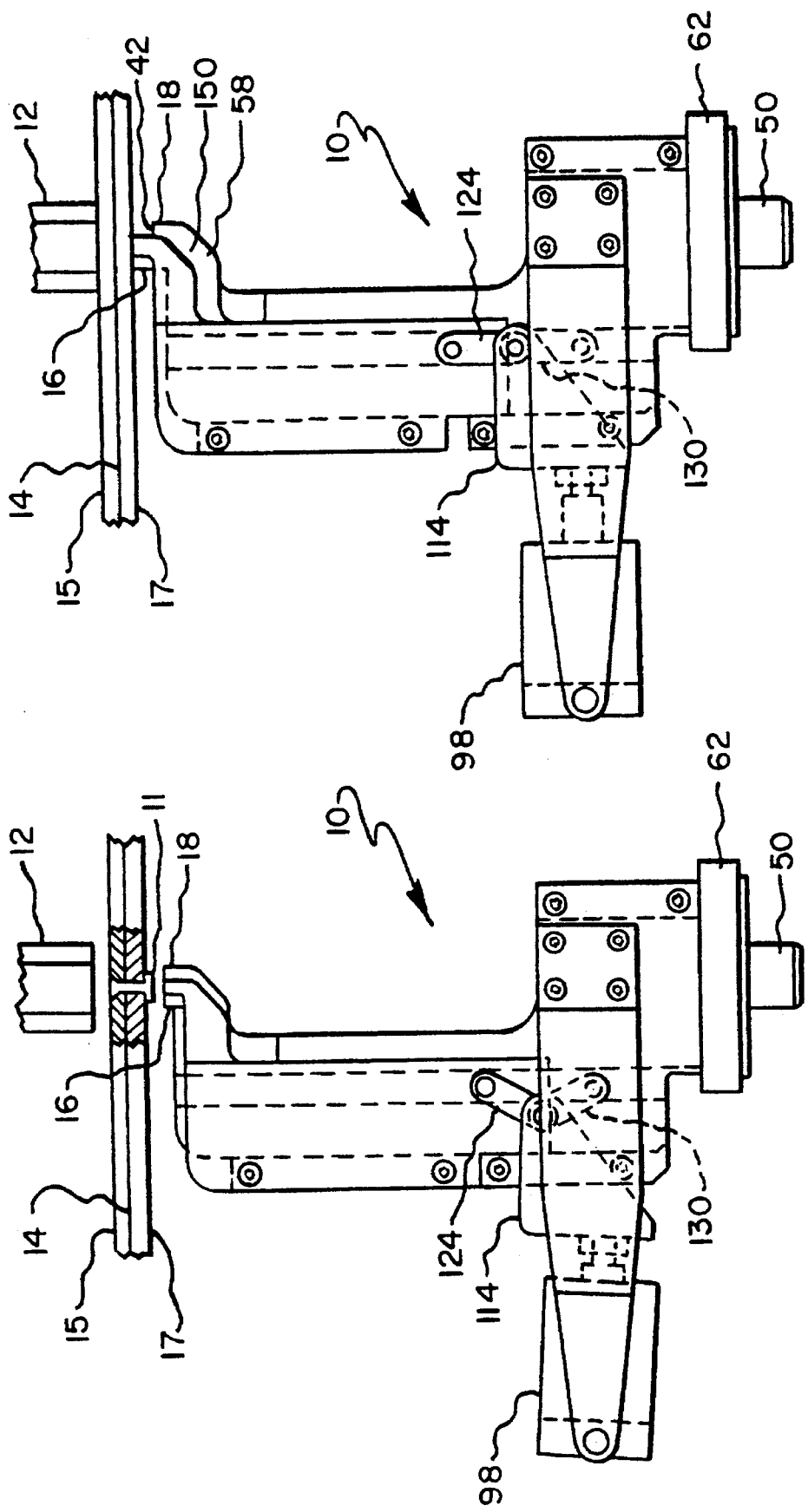

5,555,616

METHOD AND APPARATUS FOR POSITIONING OF TOOLING EFFICIENTLY

The present invention relates to the art of positioning tooling with respect to a workpiece.

One area of use of the present invention is positioning tooling in the form of drilling and riveting tools with respect to a curvilinear workpiece in the form of an aircraft fuselage section, although the principles of the present invention can be variously applied. Of particular interest in that area of use of the present invention are the skin lap splices and butt splices which are attached during a major join of an aircraft fuselage. These areas are inaccessible to conventional C-frame automatic fastening machines, and for a long time fasteners were installed by manual methods.

Recently, there has been proposed a combination of inner and outer positioning systems which carry or support inner and outer tooling, respectively, which engage the workpiece from opposite sides thereof during tooling operations thereon. Each of the inner and outer positioning systems moves the respective tooling through a large number of axes, and movements of the inner and outer positioning systems are controlled and coordinated by a control system.

In the foregoing combination, the outer positioning means includes an outer head which typically includes a linear array of tool stations which are successively translated to the workpiece along a linear path. For example, the tooling may be provided to automatically drill, insert, and upset one- or two-piece fasteners such as exterior skin rivets on an airplane fuselage.

The inner positioning means is provided to cooperate with the outer positioning means in performing the tooling functions. For example, in a riveting operation, the inner positioning means supports an anvil which upsets the head of a rivet during a riveting function. A clamp sleeve in the form of a pair of clamping members must be provided to cooperate with the outer positioning means including an outer clamp (pressure foot bushing) to clamp the workpiece while it is being riveted so as to maintain alignment of the drill hole through the workpiece. The outer clamp is also provided to prevent back side burring during the drill cycle.

In order to position the inner tooling head, carriage means have been proposed for moving the inner positioning apparatus along the length of the workpiece, and means have been proposed for pivoting the apparatus so that the inner tooling head can move circumferentially to the workpiece. There has also been proposed means for operating the inner positioning apparatus frame so that the tooling head can be moved toward and away from the workpiece, i.e., radially to the workpiece.

A curvilinear workpiece such as a fuselage having a varying diameter requires substantial radial movement of the inner tooling head which may be provided, for example, by a hydraulic cylinder means effecting radial movement of the frame of the inner positioning apparatus. Thus, the inner tooling head must be movable radially over a distance in excess of perhaps about 44 inches.

At other times it is only necessary that the inner tooling head clear an upset rivet button which may protrude inwardly from the fuselage surface a distance of perhaps about 0.160 inch. Such micro-movement of the inner tooling head in the radial direction may be required many times during a riveting operation on a fuselage, yet a great deal of power consumption as well as production cycle time is required for gross movement of the entire frame of the inner positioning means by the hydraulic cylinder means.

Strengthening members such as stringers attached to the fuselage may have portions which overhang a position to be riveted to thus tend to interfere with radial movement of the tooling head to the riveting position. It is thus considered desirable to be able to manipulate the tooling head to reach such low-clearance positions.

It is accordingly an object of the present invention to provide for micro-movement radially of a tooling head in such a way as to result in decreased production cycle time and increased power efficiency of the positioning machine.

It is another object of the present invention to have greater flexibility in positioning the tooling head as desired such as in low clearance areas of workpieces.

It is a further object of the present invention to provide increased anvil strength in tooling able to reach low clearance areas of workpieces.

It is yet another object of the present invention to provide means for such micro-movement which is rugged, reliable, and inexpensive.

In order to provide such micro-movement of a tooling head, in accordance with the present invention, means are provided for extending and retracting the head relative to the frame means for movement of the tooling radially toward and away from the workpiece. In accordance with a preferred embodiment of the present invention, the extending and retracting means comprises toggle-joint means.

The above and other objects, features, and advantages of the present invention will be apparent in the following detailed description of the preferred embodiment thereof when taken in conjunction with the accompanying drawings wherein the same reference numerals denote the same or similar parts throughout the several views.

BRIEF DESCRIPTION OF THE DRAWINGS

FIG. 1 is a schematic view illustrating apparatus for positioning tooling according to the present invention in operative position relative to a workpiece.

FIG. 2 is a schematic view of a portion of the apparatus of FIG. 1 and illustrating the operation thereof.

FIG. 3 is a top view of apparatus which embodies the present invention.

FIG. 6 is a schematic view thereof, shown clamped to the workpiece.

FIG. 7 is a schematic view thereof, shown unclamped from the workpiece after riveting for movement to another riveting position.

DETAILED DESCRIPTION OF THE PREFERRED EMBODIMENT

Figure 5:
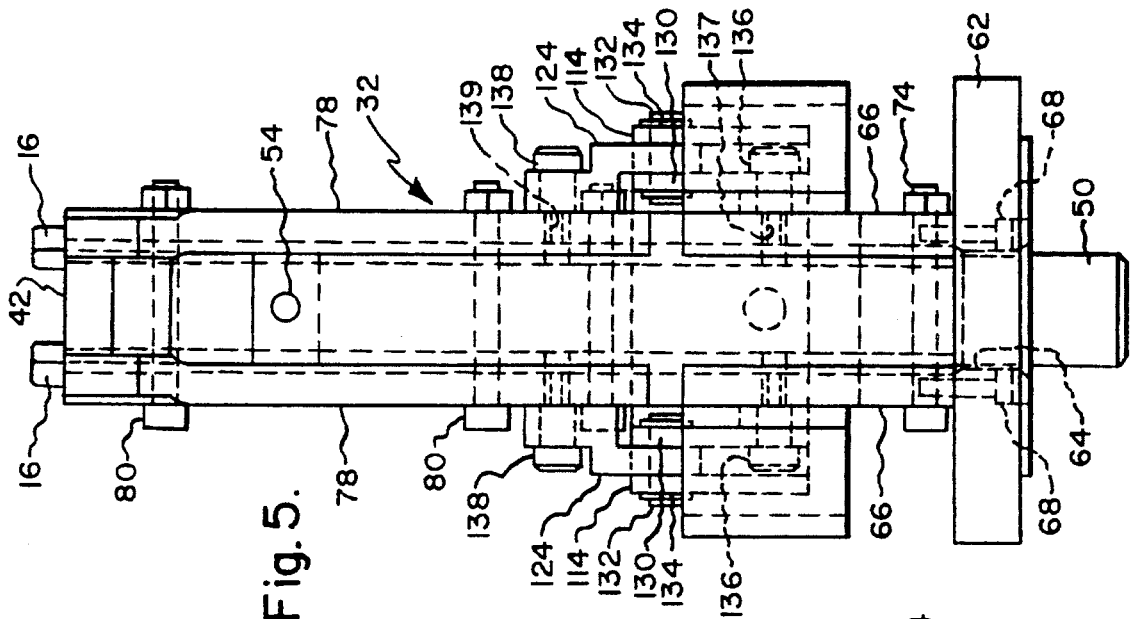
FIG. 5 is a front view thereof, i.e, taken from the right side of FIG. 4.

Referring now to FIG. 1, there is illustrated generally at 10 an inner tooling positioning system and at 12 an outer tooling positioning system, the terms "inner" and "outer" being in reference to a workpiece, illustrated at 14, such as, for example, a curvilinear workpiece. Workpieces may have various geometric configurations, and the present invention is meant to be applicable to any workpiece geometry. In the present illustration, workpiece 14 is in the form of an airplane fuselage which is cylindrical in cross-section as indicated in FIG. 1 and which is curvilinear in a longitudinal direction which is into the plane of the paper, i.e., the diameter varies over the length thereof.

The method and apparatus as illustrated herein provides automatic drilling, inserting, and upsetting of fasteners such as exterior skin rivets, illustrated at 11 in FIG. 7, on an aircraft fuselage such as the illustrative workpiece 14 comprising sections 15 and 17 to be riveted along centerlines illustrated at 13a, 13b, and 13c, a riveting operation shown being performed at position 13a in FIG. 1. The inner and outer positioning systems 10 and 12 respectively carry or support inner and outer tooling respectively which engage the workpiece 14 during the manufacturing, i.e., fastening, operation. The inner tooling includes a clamp sleeve in the form of a pair of clamping members 16 and an inner riveting anvil 18. The outer tooling, illustrated schematically at 19, typically will include the previously discussed pressure foot bushing (outer clamp), a drill spindle, an outer riveting anvil, and various workpiece inspection devices.

The inner positioning system 10 includes a first carriage means generally designated 20 which is supported on a surface spaced from workpiece 14 and which can comprise a series of platforms 22 supported on the seat tracks of the fuselage assembly. Whereas the outer positioning system 12 faces the convex outer surface of workpiece 14, the inner positioning system 10 faces the concave inner surface of workpiece 14 and is adapted for movement along the aforementioned supporting surface of platforms 22 in a direction along, i.e., substantially parallel to, the longitudinal axis of workpiece 14. To this end, carriage means 20 rides along longitudinally extending rails 24 and 26 provided on platforms 22 and is moved by a suitable drive arrangement such as a rack-and-pinion drive. For smaller increments of movement longitudinally of the workpiece, a second carriage means generally designated 21 is provided for movement along a supporting surface 23 of the first carriage means 20. To this end, second carriage means rides on rails 25 and 27 and is moved also by a suitable drive arrangement such as a ballscrew drive.

The inner positioning system 10 further comprises a frame structure, illustrated at 28, for supporting the clamping members 16 and anvil 18 from the carriages 20 and 21. The frame structure 28 includes arm means generally designated 30 which is carried by carriage means 20 and 21 and which is adapted for pivotal movement, as illustrated at 29, on carriage means 21 about an axis, illustrated at 31, which is substantially parallel to the longitudinal axis of workpiece 14. Arm means 30 is telescoping and therefore movable toward and away from workpiece 14, i.e., radially thereof, as illustrated at 33. In contrast to pivotal movement 29 which is about axis 31, such radial movement 33 is toward and away from the axis 31. Such radial movement of the frame structure 28 including the arm means 30 for movement of the clamping members 16 and anvil 18 toward and away from the workpiece 14 is provided by one or more hydraulic cylinders, illustrated at 35, or other suitable means. As the inner positioning system 10 moves along paths relative to workpiece 14 to reach various locations on the workpiece where the tools are to perform operations on the workpiece, outer positioning system 12 follows inner positioning system 10 under control of a control system (not shown).

By the term "radially" is meant direction or movement toward and away from an axis, such as axis 31, relative to which tooling is extended and retracted toward and away from a workpiece. This axis may also be the axis about which the frame structure, illustrated at 28, pivots. Such radial movement is provided by cylinder means 35, as illustrated at 33. By the term "circumferentially" is meant direction or movement about the axis. Such circumferential movement is illustrated at 29.

Except as described hereinafter with reference to the present invention, the inner and outer positioning systems 10 and 12 will not be described in greater detail herein. For a more detailed description of the structure and operation of suitable inner and outer positioning systems like systems 10 and 12 to which the present invention, as described hereinafter, may be applied, reference may be made to pending U.S. patent application Ser. No. 08/048,420, filed Apr. 14, 1993, entitled "Method and Apparatus for Positioning Tooling," now U.S. Pat. No. 5,477,597 and assigned to the assignee of present invention, the disclosure of which is hereby incorporated by reference. It should be understood that the present invention may be used with various riveting machines and should not be construed as being limited to use with positioning systems 10 and 12, which are described herein for purposes of illustrating and not limiting the invention. For example, the present invention may be used with a riveting system in which the workpiece is hand-held and movable to various positions for riveting wherein the frame may remain stationary.

The clamping process involves coordinated movement of the inner and outer positioning systems 10 and 12 respectively along the workpiece 14 riveting pre-tacked stringers or stiffening members, illustrated at 34, to the fuselage skin 14. For a riveting operation, the workpiece 14 and stringer are clamped between the outer tooling device 19 and the clamping members 16, the clamping members 16 having body portions 38 and portions 40 which extend from the body portions to clampingly engage the workpiece 14. The anvil 18 has a surface 42 for supporting the head of a rivet for upset thereof. The anvil surface 42 is circular and disposed between the clamp member portions 40.

For each individual riveting operation, the clamp members 16 must be moved away from the workpiece and clear the head of the upset rivet 11 for movement to the next riveting location. In addition, the clamp members 16 must also clear stringers along the path. For example, a typical stringer flanged portion, illustrated at 44, extending inwardly from the workpiece a distance of perhaps about ⅓ or ¼ inch must be cleared. Except during rivet upset, the anvil surface 42 may typically be spaced from the workpiece at the respective location to be riveted a distance of perhaps about ⅓ inch or more. This means that, as seen in FIG. 1, the anvil 18 may be moved from one riveting position to another as well as clear the flange 44 without the requirement of any radial movement thereof.

Moving the heavy frame 28 radially by means such as one or more hydraulic cylinders 35, in accordance with conventional practice, in order to unclamp from one riveting location to move to another riveting location the numerous times during a riveting operation on a fuselage that it would be necessary to do so is not only time-consuming but also requires a great deal of power. In order to decrease production cycle time and increase power efficiency of the inner positioning system 10 during unclamping from one riveting location and clamping to another or for otherwise microradial movement of the clamp members 16, in accordance with the present invention, means, illustrated generally at 46, are provided for extending and retracting the head means 32 containing the clamp members 16 relative to the frame 28 for movement of the head means 32 radially of the axis 31 toward and away from the workpiece 14. The term "head," as used herein and in the claims, is meant to refer to a member or device which contains or holds tooling and is connected to apparatus for positioning of the tooling adjacent the workpiece, and may refer to support structure for only a portion of the tooling required for an operation on a workpiece. Thus, the pair of clamping members 16 may be defined as "head means".

As each rivet 11 is upset, the clamp members 16 must be moved radially inwardly from the workpiece 14 for movement to the next rivet position, the anvil 18 being already spaced from the workpiece. In addition, since the anvil 18 also already clears the flange 44, as seen in FIG. 1, it is only necessary, in order for the tooling head to clear the flange 44 as well as a rivet button, to move the clamp members 16 radially inwardly. The distance, illustrated at 148, which the clamp members 16 must be moved radially inwardly from the workpiece is less than about 1 inch for most movements from one riveting location to another. Thus, in accordance with a preferred embodiment of the present invention, it is only necessary that the clamp members 16 be extended and retracted radially for disengaging from the workpiece and clearing the rivet button after a riveting operation and for clearing a stringer flange 44, if necessary, during movement to another riveting location. Such micro-movement is both time-consuming and power-consuming if performed by the large cylinder means 35 for movement to each riveting location. Thus, while the large hydraulic cylinder means 35 may be said to appropriately provide gross or macro-movement radially for large changes radially in the position of the tooling 16 and 18, the extending and retracting means 46 may be said to provide micro-movement radially, as illustrated at 148, of the clamp members 16 efficiently relative to the frame 28 and also the anvil 18. The extending and retracting means 46 interconnects the clamping device (head means 38) to the anvil base through an actuator 98, as discussed hereinafter, for movement of the clamping device relative to the anvil.

Figure 4:
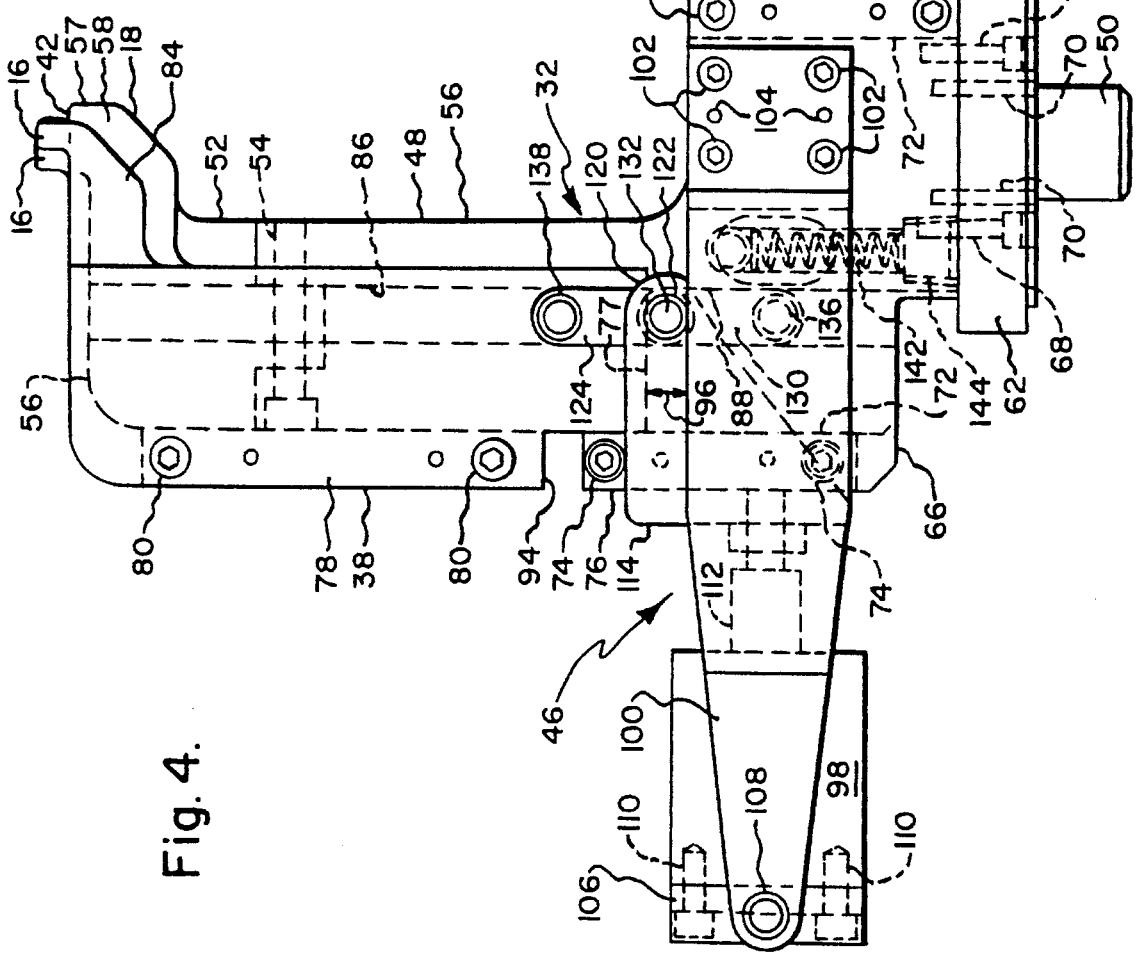
FIG. 4 is a side view thereof.

Referring to FIGS. 3, 4, and 5, the anvil 18 includes a lower or base portion 48 having a bottom cylindrical portion 50 which is rigidly attached to the frame 28 by suitable means such as a bayonet, quarter turn mounting seat. The cylindrical anvil portion 50 passes through an aperture 64 in base plate 62. The anvil 18 also includes a replaceable upper portion 52 which is rigidly connected to the lower portion by suitable means such as a tongue-and-groove connection and bolting by screw 54. The upper anvil portion 52 has a body 56 which is generally in alignment radially with the frame arm 30 and which supports a radially outwardly extending portion 57 containing the anvil surface 42 offset circumferentially from the frame arm 30 as well as the body 56 by means of an arm portion 58, i.e., the arm portion 58 extends in a direction generally normal to the radial direction. Stated another way, the portion 57 containing the anvil surface 42 may be said to be cantileverly supported from the anvil body 56 by the anvil arm portion 58. A pair of keyways 60 extend longitudinally on the anvil 18 including both the lower and upper anvil portions 48 and 52 respectively along both sides thereof and radially of axis 31 for reasons that will be described more fully hereinafter.

A pair of parallel upstanding side plates 66 are suitably attached to the base plate 62 such as by screws 68, dowel pins 70 being provided for positional retention. Side plates 66 are attached to each other by tie plates 72 at both the front and the rear and by bolts 74 or by other suitable means. The side plates 66 include upstanding portions 76 which extend upwardly, i.e., radially outwardly from the body 77 thereof along the rear edge thereof. Unless otherwise specified, the terms "upwardly" and "downwardly", as used herein, are meant to refer to orientation radially outwardly and radially inwardly respectively. A pair of upper side plates 78, which support clamp portions 16, extend along both sides of the anvil 18 in line with the lower side plates 66 and are secured together by suitable means such as tie plate 79 (upwardly thereof) and bolts 80. Side plates 78 include body portions 38 which extend radially upwardly and terminate in portions 84 which extend outwardly therefrom, i.e., normal to the radial direction to support the clamp engagement portions 40, which are integral therewith and extend upwardly therefrom. The clamp engagement portions 40 are thus offset circumferentially from the body portions 38. Stated another way, the clamp engagement portions 40 may be said to be cantileverly disposed from the body portions 38. For the purposes of this specification and the claims, the body portions 38 are the portions of upper side plates 78 which extend radially from the frame structure 28, and portions 84, which extend generally at right angles to the radial direction, constitute means for supporting the clamp engagement portions 40 so that they are offset circumferentially from the body portions 38. Similarly, for the purposes of this specification and the claims, the anvil body portion 56 is the portion or portions of the anvil 18 which extend radially from the frame structure 28, and arm portion 58, which extends generally at right angles to the radial direction, constitutes means for supporting the anvil surface 42 so that it is offset circumferentially from the body portion 56. However, it should be understood that the present invention is not limited to such a geometric configuration but may include other anvil and clamp assembly geometrics relative to the workpiece geometry. Thus, while an offset anvil is shown, any other suitable anvil configuration, such as straight, may be provided.

Both the upper and lower side plates 78 and 66 respectively have aligned keyways 86 and 88 respectively which mate with the keyway 60 in the anvil 18. An elongate key member 90, which is rectangular in section, is received in each pair of mating keyways 60 and 86, 88. The key member 90 is suitably attached to the anvil 18 such as by three screws 92 spaced along the length thereof. As illustrated in FIG. 4, the upper side plates 78 each has a notch 94 (corresponding to upstanding portion 76) in the rear lower corner thereof. As illustrated in FIGS. 1 and 4, the upper side plates 78 are spaced from the lower side plates 66 a distance, illustrated at 96, when in the clamped position, which allows the upper side plates 78 to be moved radially downwardly by this distance.

The extending and retracting means 46 is suitably operated by the actuator 98 which may be, for example, a hydraulic cylinder which is suitably mounted by means such as mounting brackets 100 which extend along both sides of the lower side plates 66 and are attached thereto by suitable means such as bolts 102, dowel pins 104 being provided for positional location. Alternatively, the actuator 98 may be a pneumatic, solenoid, or motor actuator or other suitable actuator. A cylinder mounting plate 106 is mounted between the rear ends of the mounting brackets 100 by means of a pivot pin 108 or other suitable means, and the hydraulic cylinder 98 is suitably attached thereto such as by means of screws 110. Thus, the actuator 98 of the extending and retracting mechanism 46 is connected to a pivot joint provided by pin 108 to allow for angular movements thereof. The piston rod 112 of the cylinder 98 is suitably attached to a clevis 114 such as with a jam nut 116. The clevis 114 includes a generally rectangular plate 118 to which the piston rod 112 is attached and to which are welded at the sides thereof a pair of generally triangular plates 120 which extend along the sides of but are spaced from the lower side plates 66 and each of which has an aperture 122 therein which is in alignment with the key members 90.

Each of the clevis triangular portions 120 is attached to a pair of links including an upper hinge bracket 124 and a pivot hinge bar 130 by suitable means such as a guide pin 132 which extends through clevis aperture 122 and apertures in the hinge bracket and hinge bar 124 and 130 respectively. A retaining ring 134 is provided for retaining them thereon so that the clevis portion 120, upper hinge bracket 124, and pivot hinge bar 130 on each side are rotatable on the respective pin 132. The lower end of each pivot hinge bar 130 is pivotly anchored to the respective lower side plate 66 by suitable means such as screw 136 the end portion of which is rigidly received in an aperture 137 in the respective lower side plate 66. The upper end of each upper hinge bracket 124 is suitably secured to the respective upper side plate 78 by suitable means such as screw 138 for pivotal movement. The end portion of each screw 138 is rigidly received in an aperture 139 in the respective upper side plate 78 to effect radial movement thereof as the screw 138 is moved radially.

As is conventional in the art, the anvil 18 is biased to the radially inwardly position spaced from the workpiece shown in the drawings and is moved radially outwardly by means of an upset cylinder (not shown) for purposes of rivet upset. A die spring 142, secured by a hollow hex plug 144, is provided to return the anvil 18 to the radially inwardly position illustrated in the drawings after rivet upset. For example, the die spring 142 may be of a type sold by Danly Machine Corporation of Chicago, Ill., and the plug 144 may be of a type sold by Parker Hannifin Corporation of Columbus, Ohio.

Referring to FIG. 2, operation of the cylinder 98 to move the piston rod 112 and clevis 114 rearwardly effects movement of the pin 132 and accordingly the connected ends of the toggle links 124 and 130 rearwardly. Since the pin 136, being attached to the lower side plate 66, remains stationary, the upper end of the toggle link 124 and accordingly the pin 138 must be pulled downwardly (radially inwardly) thereby pulling the upper side plates 78 downwardly, as illustrated at 146, whereby the clamp portions 16 are pulled downwardly (radially inwardly) a minimum distance, illustrated at 148, which may be up to about 1 inch, necessary to disengage the clamps 16 from the workpiece and clear flanges 44, the anvil 18 remaining stationary since it can already clear the flange 44. For example, the distance 96 may be about 0.312 inch to achieve a minimum distance 148. It should of course be understood that this distance 148 may be varied according to the requirements of a workpiece which a machine is to be used with.

After movement to a new riveting location and after the stringer flange 44 has been cleared, if necessary, the clamp members 16 may be raised back to the clamping position, as illustrated in FIGS. 1 and 6, for another riveting operation by operation of cylinder 98 whereby the toggle members 124 and 130 are lockingly moved into radial alignment with each other so as to prevent any downward movement of the clamp members 16 during a riveting operation. The key members 90 guide the radial movement of the upper side plates 78 for precise positioning of the clamp members 16. The fuselage may include not only circumferentially-extending stringers 34 but also circumferentially-extending frame members (not shown) which are provided for skin stiffness to maintain aircraft integrity. These members may cause tight clearances for positioning of the clamp members 16 and anvil 18 for riveting. In accordance with a preferred embodiment of the present invention the previously discussed circumferential offset of the anvil 18 and clamp members 16 is provided to permit them to reach areas which would otherwise be inaccessible such as the tight clearance riveting position illustrated at 13a in FIG. 1 wherein there is an overhanging portion 37 of strengthening member 34.

In addition to decreased production cycle time and increased power efficiency of the positioning machine 10, the present invention is also provided to allow the strength of the tooling to be increased for such low clearance workpieces by allowing a larger anvil cross-section into the fastener forming area. As previously discussed, prior art positioning machines fixed the clamping device means with respect to the anvil such that the positioning means must be activated for movement of the frame structure for small incremental moves. Since, as illustrated in FIG. 7, the clamp members 16 must be moved inwardly for movement of the tooling from one rivet location to another, the bottom of the arm portion 58 of the anvil 18 may be "beefed up" by an increased thickness equal generally to the distance from the anvil surface 42 to the top (workpiece engaging surface) of the clamp to increase its structural strength without sacrificing the ability of the tooling to reach tight clearance areas such as under the overhanging portion 37 of strengthening member 34. Such an increased anvil thickness portion is illustrated at 150 in FIG. 6. As seen in FIG. 7, such an increased thickness portion 150 may be provided without sacrifice of the ability of the tooling to reach tight clearance locations.

In summary, the provision of the toggle means 46 allows micro-movement radially of the head means comprising the clamp members 16 for decreased production cycle time as well as increased power efficiency in moving from one rivet position to another whereby the riveting operation on a fuselage may be conducted more efficiently and thus at less cost. The provision of the toggle means also allows the anvil strength to be increased without sacrifice of the ability of the tooling to reach tight clearance locations.

It should be understood that while the invention has been described in detail herein, the invention can be embodied otherwise without departing from the principles thereof, and such other embodiments are meant to come within the scope of the present invention as defined by the appended claims.

What is claimed is:

1. A method for positioning tooling with respect to a workpiece comprising the steps of:
   a. supporting the tooling in a head;
   b. supporting the head by a frame;
   c. moving the frame relative to the workpiece along and about an axis;
   d. extending and retracting the frame for movement radially of a workpiece engagement surface on the head toward and away from the workpiece;
   e. extending and retracting the head relative to the frame for movement radially of the workpiece engagement surface toward and away from the workpiece;
   f. selecting the head to be adapted so that the workpiece engagement surface is offset circumferentially from a body portion of the head which extends radially; and
   g. positioning the workpiece engagement surface in a position which is at least partially overhung by a workpiece strengthening member portion.

2. A method according to claim 1 wherein the step of extending and retracting the head comprises toggling a joint between the head and the frame.

3. A method according to claim 2 wherein the step of toggling the joint comprises effecting pivoting movement of a pair of pivotly connected links, one of which is pivotly connected to the head and another of which is pivotly connected to the frame, between a first position wherein the links are in line with each other for extension lockingly of the head relative to the frame and a second position wherein the links form an angle with each other for retracting the head relative to the frame.

4. Apparatus for positioning tooling with respect to a workpiece comprising head means, frame means for supporting said head means, means for extending and retracting said frame means for movement of the tooling toward and away from the workpiece, means for extending and retracting said head means relative to said frame means for movement of the tooling toward and away from the workpiece, and carriage means for moving said frame means relative to the workpiece including means for moving said frame means along and about an axis, wherein said means for extending and retracting said head means comprises toggle joint means for connecting said head means to said frame means, and wherein said head means includes a radially extending body portion and further includes a portion which is supported by and extends circumferentially from said body portion and is adapted to define workpiece engagement surface which is offset circumferentially from said body portion to allow positioning of said workpiece engagement surface under overhanging portions of workpiece strengthening members for engaging the workpiece.

5. Apparatus according to claim 4 wherein said head means is movable relative to said frame means over a distance equal to less than about 1 inch.

6. Apparatus for positioning tooling relative to a workpiece comprising head means, frame means for supporting said head means, carriage means for moving said frame means relative to the workpiece including means for moving said frame means along and about an axis, means for extending and retracting said frame means for movement of the tooling toward and away from the workpiece, and means for extending and retracting said head means relative to said frame means for movement of the tooling toward and away from the workpiece, said extending and retracting means comprising a toggle joint means for connecting said head means to said frame means, said toggle joint means comprising a pair of links pivotly connected to each other and one of which is pivotly connected to said head means and an other of which is pivotly connected to said frame means and further comprising means for pivoting said links between a first position wherein said links are in line with each other for lockingly extending said head means relative to said frame means and a second position wherein said links form an angle with each other for retracting said head means relative to said frame means, and wherein said head means includes a radially extending body portion and a portion which is supported by and which extends circumferentially from said body portion and which is adapted to define workpiece engagement surface, and means for positioning said workpiece engagement surface in a position which is at least partially overhung by a workpiece strengthening member, said positioning means comprising means for offsetting said workpiece engagement surface circumferentially from said body portion.

7. Apparatus for positioning tooling with respect to a workpiece comprising head means, frame means for supporting said head means, carriage means for moving said frame means relative to the workpiece including means for moving said frame means along and about an axis, said head means including a radially extending body portion and a portion which is supported by and extends circumferentially from said body portion and which is adapted to define workpiece engagement surface, means for extending and retracting said frame means for movement radially of said workpiece engagement surface toward and away from the workpiece, means for extending and retracting said head means relative to said frame means for movement radially of said workpiece engagement surface toward and away from the workpiece, and means for positioning said workpiece engagement surface in a position which is at least partially overhung by a workpiece strengthening member portion, said positioning means comprising means for offsetting said workpiece engagement surface circumferentially from said body portion.

8. Apparatus according to claim 7 wherein said means for extending and retracting said head means comprises toggle joint means for connecting said head means to said frame means.

9. Apparatus according to claim 8 wherein said toggle joint means comprises a pair of links pivotly connected to each other and one of which is pivotly connected to said head means and an other of which is pivotly connected to said frame means and further comprising means for pivoting said links between a first position wherein said links are in line with each other for lockingly extending said head means relative to said frame means and a second position wherein said links form an angle with each other for retracting said head means relative to said frame means.

10. Apparatus according to claim 7 wherein said head means is movable relative to said frame means over a distance equal to less than about 1 inch.

* * * * *